(12) United States Patent
Schiffman et al.

(10) Patent No.: US 11,146,406 B2
(45) Date of Patent: Oct. 12, 2021

(54) MANAGING ENTITLEMENT

(71) Applicant: HEWLETT-PACKARD DEVELOPMENT COMPANY, L.P., Houston, TX (US)

(72) Inventors: Joshua Serratelli Schiffman, Bristol (GB); Christopher Charles Mohrman, Houston, TX (US); Luke T. Mather, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 679 days.

(21) Appl. No.: 16/076,232

(22) PCT Filed: Jul. 26, 2017

(86) PCT No.: PCT/US2017/044035
§ 371 (c)(1),
(2) Date: Aug. 7, 2018

(87) PCT Pub. No.: WO2019/022738
PCT Pub. Date: Jan. 31, 2019

(65) Prior Publication Data
US 2021/0203512 A1    Jul. 1, 2021

(51) Int. Cl.
*H04L 9/32* (2006.01)
*G06F 21/62* (2013.01)
*H04L 29/06* (2006.01)

(52) U.S. Cl.
CPC .......... *H04L 9/3263* (2013.01); *G06F 21/629* (2013.01); *H04L 63/0823* (2013.01); *G06F 2221/2141* (2013.01)

(58) Field of Classification Search
CPC . H04L 9/3263; H04L 63/0823; G06F 21/629; G06F 2221/2141
USPC ........................................................ 713/156
See application file for complete search history.

(56) References Cited

U.S. PATENT DOCUMENTS

| | | |
|---|---|---|
| 7,454,794 B1 | 11/2008 | Hibberd |
| 7,549,054 B2 | 6/2009 | Brodie et al. |
| 8,533,805 B2 | 9/2013 | Orazi et al. |
| 8,842,841 B2 | 9/2014 | Hook et al. |
| 9,088,565 B2 | 7/2015 | Cuellar et al. |
| 9,491,577 B1 | 11/2016 | Jones |

(Continued)

FOREIGN PATENT DOCUMENTS

WO      2009111401 A1      9/2009

OTHER PUBLICATIONS

"Access Certification: Addressing and Building On a Critical Security Control", Oracle, Retrieved from Internet: http://www.oracle.com/us/products/middleware/identity-management/061144.pdf, 2010, 10 Pages.

*Primary Examiner* — Peter C Shaw
(74) *Attorney, Agent, or Firm* — Trop Pruner & Hu PC

(57) ABSTRACT

A method for managing entitlement of a device to access a service, the method comprising providing an authenticated identity for the device, the authenticated identity including a public encryption key pair associated with the device signed by a trusted authority, and generating a device entitlement certificate encoding an authorisation related to the service and including a public key of the public encryption key pair associated with the device, wherein the device entitlement certificate is signed by the trusted authority.

14 Claims, 2 Drawing Sheets

(56) References Cited

U.S. PATENT DOCUMENTS

| | | | |
|---|---|---|---|
| 9,947,008 B1* | 4/2018 | Camacho Diaz | ............................ G06Q 20/40145 |
| 2008/0052772 A1 | 2/2008 | Conrado et al. | |
| 2008/0267410 A1* | 10/2008 | Dellow | ................. H04L 9/3247 380/278 |
| 2012/0254618 A1 | 10/2012 | Moore | |
| 2014/0189807 A1* | 7/2014 | Cahill | ................. H04L 63/0861 726/4 |
| 2015/0052585 A1 | 2/2015 | Matthews et al. | |
| 2016/0142392 A1* | 5/2016 | Ahmed | ................. H04L 63/205 726/7 |
| 2018/0007557 A1* | 1/2018 | Lee | ..................... H04W 12/041 |
| 2018/0253539 A1* | 9/2018 | Minter | ................. H04W 12/069 |
| 2019/0371176 A1* | 12/2019 | Montemurro | ........... H04L 63/20 |

* cited by examiner

MANAGING ENTITLEMENT

BACKGROUND

In a device to device (D2D) computing environment such as a smart office or home, users or administrators can authorise a set of actions that devices can perform based on a user or device policy that dictates the actions such authorisations confer. A service provider device can contact a signing authority to authorise and produce an authentication certificate.

BRIEF DESCRIPTION OF THE DRAWINGS

Various features of certain examples will be apparent from the detailed description which follows, taken in conjunction with the accompanying drawings, which together illustrate, by way of example only, a number of features, and wherein.

DETAILED DESCRIPTION

Figure 1:
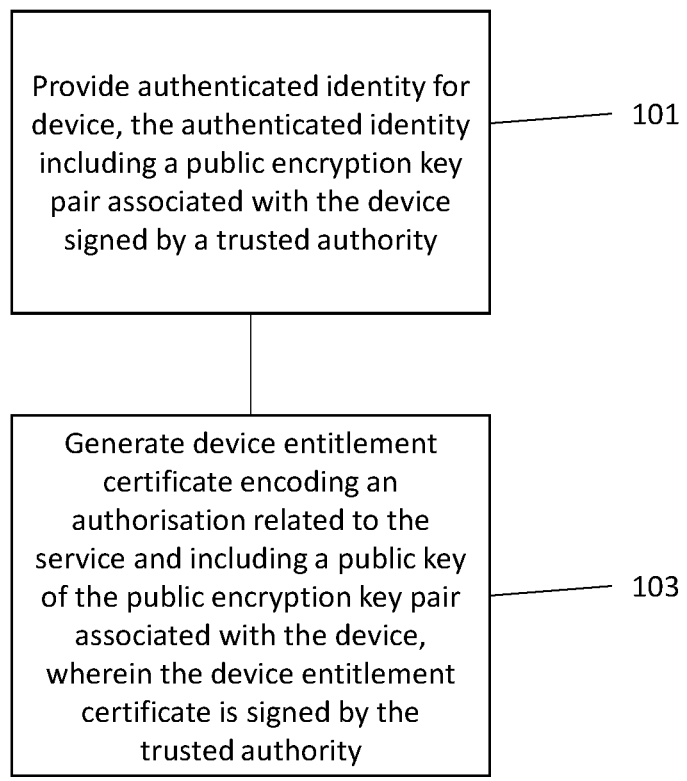
FIG. 1 is a schematic representation of a method for managing entitlement of a device to access a service according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Decentralized, service provider endpoint devices may not have persistent access to policy data used to determine whether a requesting device with an associated identity has appropriate authorization to use the offered service. Placing a policy database on a service provider endpoint can create a management issue. For example, keeping the endpoint database updated and synchronized is challenging. With each request, the service provider makes an authorization check with a policy service to verify that the consuming device is authorized to use the service. In environments where a service provider device is initially configured but then deployed into an environment without a persistent connection to the enterprise IT infrastructure such authorisation checks may be performed on an out-of-data policy.

In an example, an environment may be a corporate enterprise setting where the company IT administration has an employee database with corresponding usernames and roles and rights within the company. In addition, IT may maintain a certificate authority (CA) that produces authoritative statements about the identity of a public key pair's owner. In such an environment, employees receive usernames (e.g., email addresses) and can be assigned different roles according to their function within the company (e.g., admin, sales, engineering, legal). A role has a corresponding set of functionality to perform its tasks. Devices can be configured in the company to provide access to employee's based on their roles or individual employee rights. However, the company may not have an infrastructure that gives service endpoint devices persistent access to the IT employee database. This can occur in environments where the endpoint devices use specialized peer-to-peer communication radios (Bluetooth LE) or operates on a separate and isolated network. Such separation can be done for security to minimize an attacker's access if the network was compromised.

According to an example, there is provided a method for managing device access to a service when there is no persistent access to an infrastructure to enable authorisation for the access to be checked. In an example, a device can present an entitlement certificate to a service provider that includes an authorisation, permission or token that specifies the device privileges in relation to the service (e.g. access, read, write and so on). The entitlement is signed by a trusted authority, and can therefore be verified by the service provider. An entitlement certificate also includes a public key of the device so as to bind it that that device.

Accordingly, in, for example, internet of things (IoT) rich office or home environments, devices that expose services for other nearby devices to use only can validate an authorization token instead of performing an authorization check against a remote user access control policy. Thus, access control to services can be maintained when devices are communicating in a peer to peer environment or without constant access to a backend policy decision point.

In an example, there is provided a method for encoding an authorization to use a service (and/or specific functions/APIs of the service) into a token that can be bound to the identity of the device. Thus, a device or apparatus can request an authorization to use such services ahead of time and present the authorization token at the time of use. That is, a certificate that has encoded "entitlements" or authorized permissions to use services can be presented. The certificate can be granted from a policy decision point like a management service.

In an example, when a consuming device or apparatus establishes an authenticated session with a service provider device, the consumer can supply its entitlement, and the service provider device can verify the authorization's validity (correctly signed by a trusted third party) and allow access based on the encoded permissions and the service provider's only policies.

Encoding entitlements into a certificate means that an online or persistent policy-identity database that all devices have access to is not required. Instead, offline (non-persistent) authorization checking is used without a singleton policy-identity database.

FIG. 1 is a schematic representation of a method for managing entitlement of a device to access a service according to an example. In block 101 a certified identity is provided for the device. The certified identity includes a public encryption key pair associated with the device signed by a trusted authority. In block 103, a device entitlement certificate encoding an authorisation related to the service and including a public key of the public encryption key pair associated with the device is generated. In an example, the device entitlement certificate is signed by the trusted authority. In an example, the entitlement encoding is determined by the rights that the requesting identity is granted.

Figure 2:
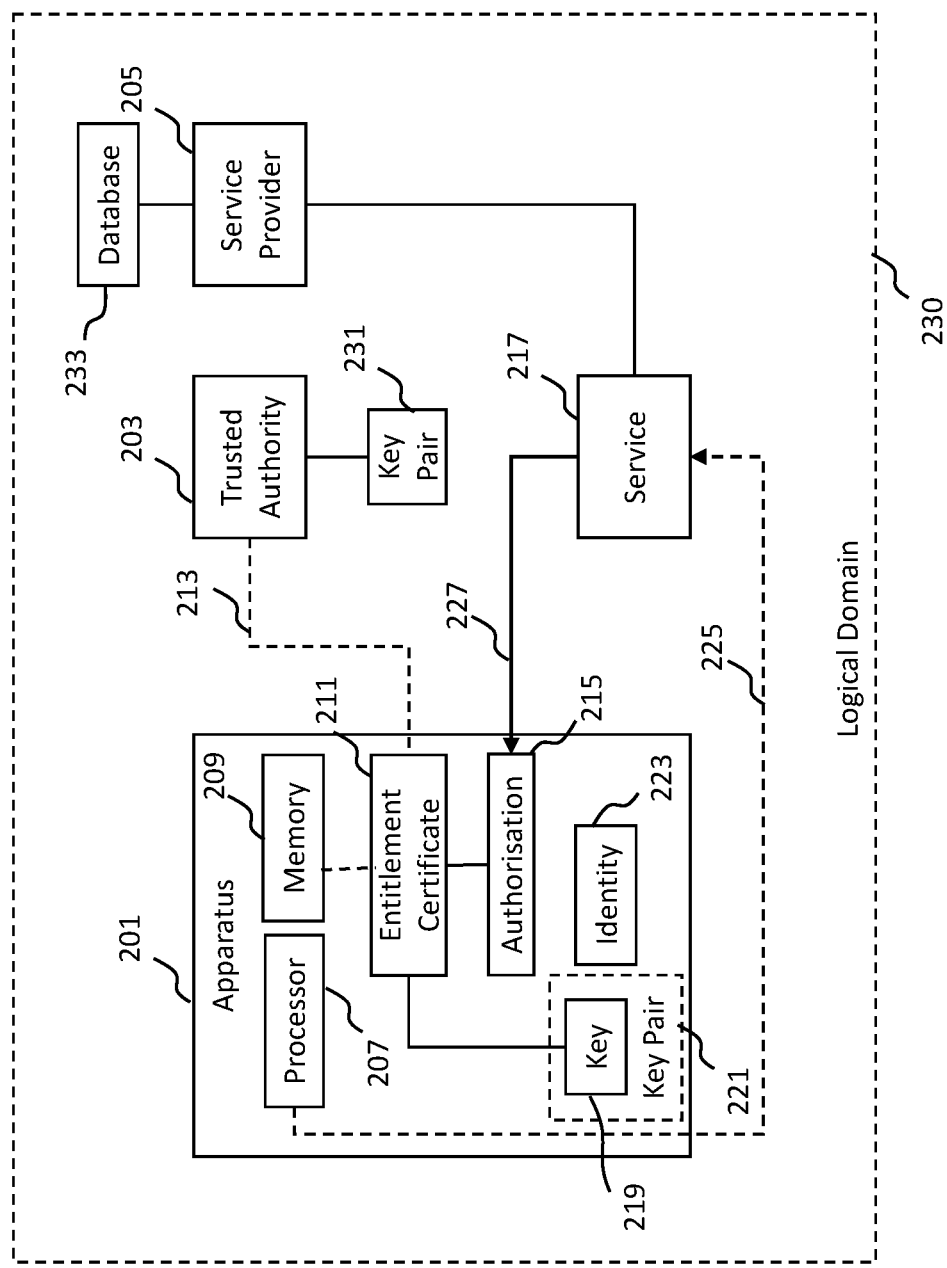
FIG. 2 is a schematic representation of a system according to an example.

FIG. 2 is a schematic representation of a system according to an example. An apparatus 201 includes a processor 207 and a memory 209. In an example, the memory 209 stores an entitlement certificate 211 signed 213 by a trusted authority 203. The certificate 211 encodes or comprises an authorisation 215 related to a service 217 provided by a service provider 205 that apparatus 201 can or desires to use. The certificate 211 includes a public key 219 of a public encryption key pair 221 associated with the apparatus 201. The public encryption key pair 221 associated with the apparatus

201 is signed by the trusted authority 203 to generate an authenticated apparatus identity 223.

When the apparatus 201 is to access service 217, processor 207 can request access 225 to the service, and provide the entitlement certificate as part of the request or in response to an entitlement query 227 from the service 217. The request can be made over a wired, wireless or near-field communication link between the apparatus 201 and service 217 as provided by the service provider 205. Similarly, communication between the apparatus 201 and trusted authority 203 can be by way of wired, wireless or near-field communication link.

According to an example, the signing authority 203 can be instantiated for a given logical domain 230, and has a signing public key pair 231. For example, the logical domain 230 can relate to a set of services that may be functionally and/or geographically linked or related. Alternatively, the logical domain may relate to a set of services that are protected from general consumption for example. In an example, the authority 203 can be provided for the domain 230 only, or may also be a signing authority for multiple other domains.

As noted above, the participating apparatus or device 201 also has a public key pair 221, which is signed by the authority 203 to create the authenticated identity 223. Entitlements are also signed by the authority 203 and encapsulated in a separate entitlement certificate 211. As noted, in an example, this entitlement certificate 211 contains the public key 219 of the associated device 201 to bind it to that device. Accordingly, an arbitrary encoding of permissions on a per-domain or logical basis is supported.

According to an example, identity and entitlement certificates 211 can also use time or other contextual information to create a validity period or context. For example, a location can be included in an entitlement certificate 211 to restrict those permissions to be only used in a particular location. Certificates can also include a rate limit, creating a limit on the number of times those permissions can be used on a targeted device 201 for example.

In an example, policy encodings can be explicit—stating API-level functions that can be used—to implicit via roles. This encoded object can then be signed by a trusted CA, which the service endpoint is able to verify using a certificate of the trusted CA.

One example is to encode an entitlement as an XML object that lists the specific services within the administrative domain that can be used along with a a key value, such as:

Key-value: <domain.service.operation=value>

For example, <corp.monitor.read_values=True>, which specifies the domain (corp), the service (monitor), the requested entitlement (read_values) and the authorisation (True). Such a format makes interpretation simple, and provides the ability to enable fine grain permissions.

In an example, role-based access control (RBAC) can also be used. For example, a role can be: admin, user, or guest, and a role can be specific to the service in question. In an example, the service provider 205 can store a local database 233 of associated permissions authorized for that role Another approach is to use a space-efficient encoding of permissions in the form of a bit-vector. For environments with a finite and known set of access permissions, the entitlement can be encoded as 1 bit within the vector on the corresponding bit position. This compact representation can then be transmitted quickly and with minimal energy requirements. This is often valuable in IoT devices with limited power and bandwidth.

According to an example, revocation of an entitlement certificate can be effected using short lived expiration periods. For example, a set of base entitlements that a device should possess for the longest period can be generated. An example is giving all employees access to services that all employees should be able to use like printers or control of the door locks. More specialized permissions would only be granted for a limited time and thus could have tighter expiration periods.

In an example, a combination of revocation lists and propagation of revocation information can also be used. For example, an entitlement might have a version number indicating a particular epoch. When a revocation is issued, future entitlements can be issued with a high epoch number. The service provider device can keep the highest witnessed value in memory. When an entitlement is presented that is a sufficient number of epochs behind, the provider could request that the device obtain a more recent entitlement.

According to an example, there is therefore provided a communication protocol with offline-verifiable notions of entitlements and access control. This can include printer identity provisioning and conference room collaboration use cases for example. The encoding can also be applied to printer authorizations for mobile and public printing scenarios. For example, a guest or customer working in a collaborative space or public space could request an entitlement to print at any number of printers or rendering devices in multiple locations. Once granted, the user can present their token after authenticating to gain access to the printer service. The printer does not need to contact an entitlement granting service or any other policy decision points. This enables printers to be placed in locations without connectivity to an outside network. Multiple device domains are supported. That is, a device can have more than one identity and entitlement certificate and use them in different solution domains.

Examples in the present disclosure can be provided as methods, systems or machine-readable instructions. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Examples may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and examples may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 3:
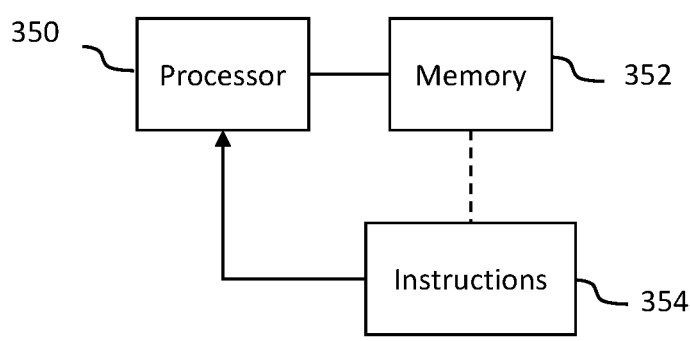
FIG. 3 is an example of a processor associated with a memory according to an example.

FIG. 3 shows an example of a processor 350 associated with a memory 352 according to an example. The memory 352 comprises computer readable instructions 354 which are executable by the processor 350. The instructions 354 can comprise:

instructions to generate an authenticated identity for the device, the authenticated identity including a public encryption key pair associated with the device signed by a trusted authority;

instructions to generate a device entitlement certificate encoding an authorisation related to the service and including a public key of the public encryption key pair associated with the device, wherein the device entitlement certificate is signed by the trusted authority;

instructions to apply a validity period to the entitlement certificate;

instructions to apply a context for the entitlement certificate;

instructions to apply a rate limit for the entitlement certificate;

instructions to restrict the authorisation for use in a location defined by the applied context;

instructions to define a restriction to the number of times the authorisation can be used with the service.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for managing entitlement of a device to access a service, the method comprising: providing an authenticated identity for the device, the authenticated identity including a public encryption key pair associated with the device signed by a trusted authority; and generating a device entitlement certificate encoding an authorisation related to the service and including a public key of the public encryption key pair associated with the device, wherein the device entitlement certificate is signed by the trusted authority and wherein the device entitlement certificate restricts the authorisation to a physical location.

2. A method as claimed in claim 1, further comprising instantiating the trusted authority for a predefined logical domain.

3. A method as claimed in claim 1, further comprising defining a validity period for the entitlement certificate.

4. A method as claimed in claim 1, further comprising defining a context for the entitlement certificate.

5. A method as claimed in claim 1, further comprising defining a rate limit for the entitlement certificate.

6. A method as claimed in claim 5, further comprising restricting the number of times the authorisation can be used with the service.

7. Apparatus, comprising a memory to store: an entitlement certificate signed by a trusted authority encoding an authorisation related to a service and including a public key of a public encryption key pair associated with the apparatus, wherein the device entitlement certificate restricts the authorisation to a physical location; an authenticated apparatus identity comprising the public encryption key pair associated with the apparatus that has been signed by the trusted authority; and a processor to: request access to the service; and provide the entitlement certificate as part of the request or in response to an entitlement query from the service.

8. Apparatus as claimed in claim 7, the processor further to: receive confirmation of entitlement to use the service; and access the service.

9. A machine-readable storage medium encoded with instructions for managing entitlement of a device to access a service, the instructions executable by a processor of a trusted signing authority apparatus to cause the apparatus to: generate an authenticated identity for the device, the authenticated identity including a public encryption key pair associated with the device signed by a trusted authority; and generate a device entitlement certificate encoding an authorisation related to the service and including a public key of the public encryption key pair associated with the device, wherein the device entitlement certificate is signed by the trusted authority and wherein the device entitlement certificate restricts the authorisation to a physical location.

10. A machine-readable storage medium encoded with instructions as claimed in claim 9, the instructions executable by the processor of the trusted signing authority apparatus to cause the apparatus further to: apply a validity period to the entitlement certificate.

11. A machine-readable storage medium encoded with instructions as claimed in claim 9, the instructions executable by the processor of the trusted signing authority apparatus to cause the apparatus further to: apply a context for the entitlement certificate.

12. A machine-readable storage medium encoded with instructions as claimed in claim 9, the instructions executable by the processor of the trusted signing authority apparatus to cause the apparatus further to: apply a rate limit for the entitlement certificate.

13. A machine-readable storage medium encoded with instructions as claimed in claim 11, the instructions executable by the processor of the trusted signing authority apparatus to cause the apparatus further to: restrict the authorisation for use in a location defined by the applied context.

14. A machine-readable storage medium encoded with instructions as claimed in claim 9, the instructions executable by the processor of the trusted signing authority apparatus to cause the apparatus further to: define a restriction to the number of times the authorisation can be used with the service.

\* \* \* \* \*